F. W. BURSTALL.
UTILIZATION OF EXHAUST HEAT FROM INTERNAL COMBUSTION ENGINES.
APPLICATION FILED FEB. 24, 1920.
1,359,447.
Patented Nov. 16, 1920.
3 SHEETS—SHEET 1.
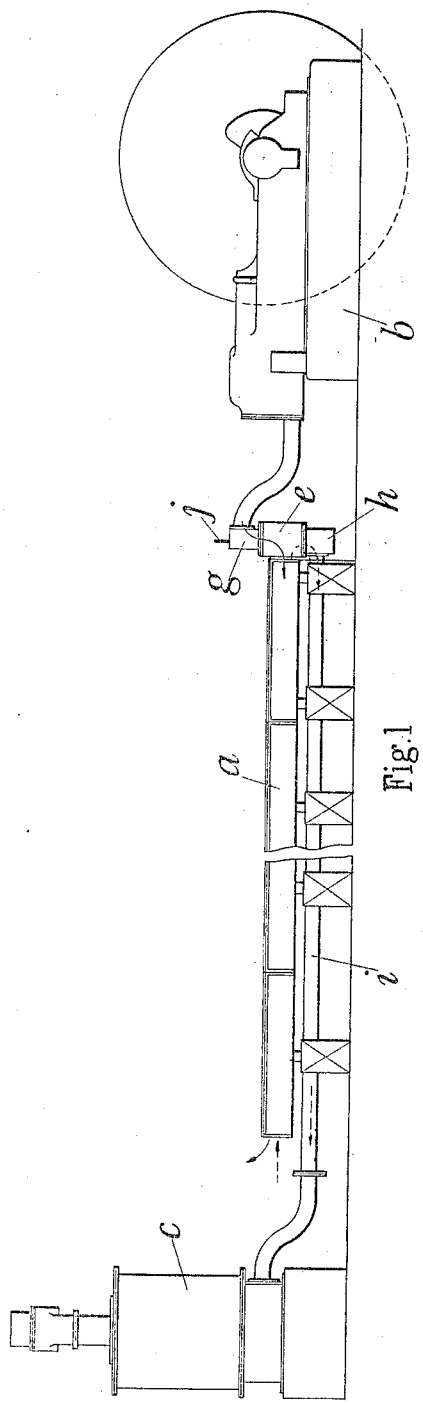
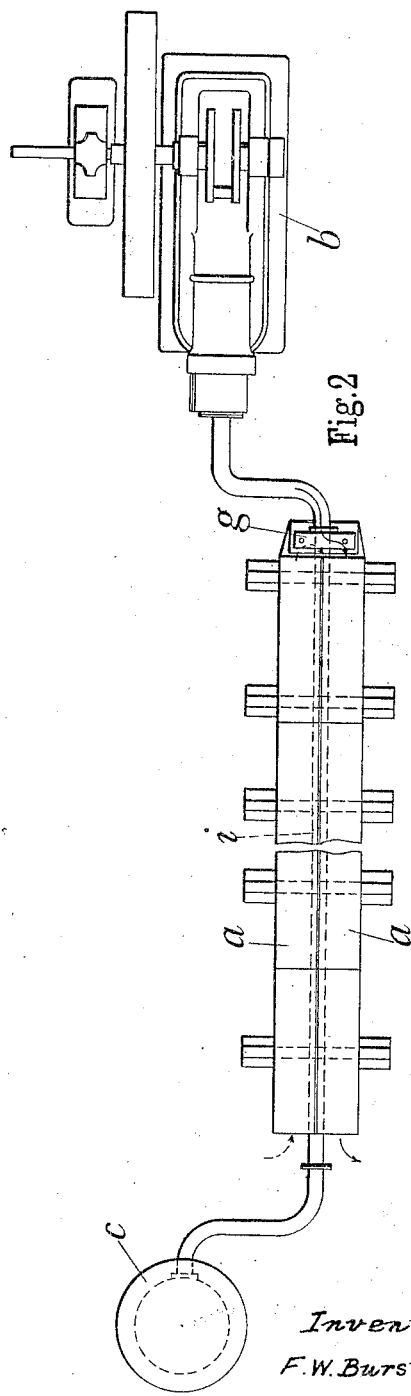
Inventor
F. W. Burstall.
By H. R. Kerslake
Atty.

F. W. BURSTALL.
UTILIZATION OF EXHAUST HEAT FROM INTERNAL COMBUSTION ENGINES.
APPLICATION FILED FEB. 24, 1920.
1,359,447.
Patented Nov. 16, 1920.
3 SHEETS—SHEET 2.
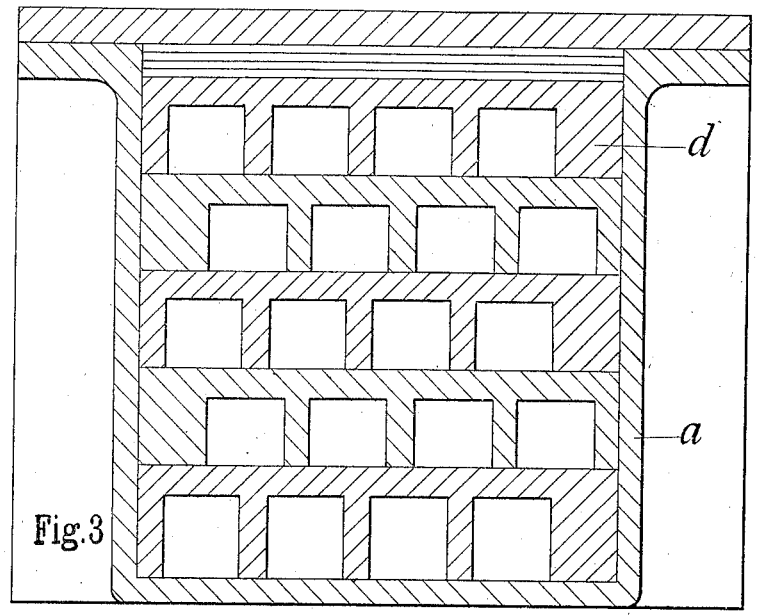
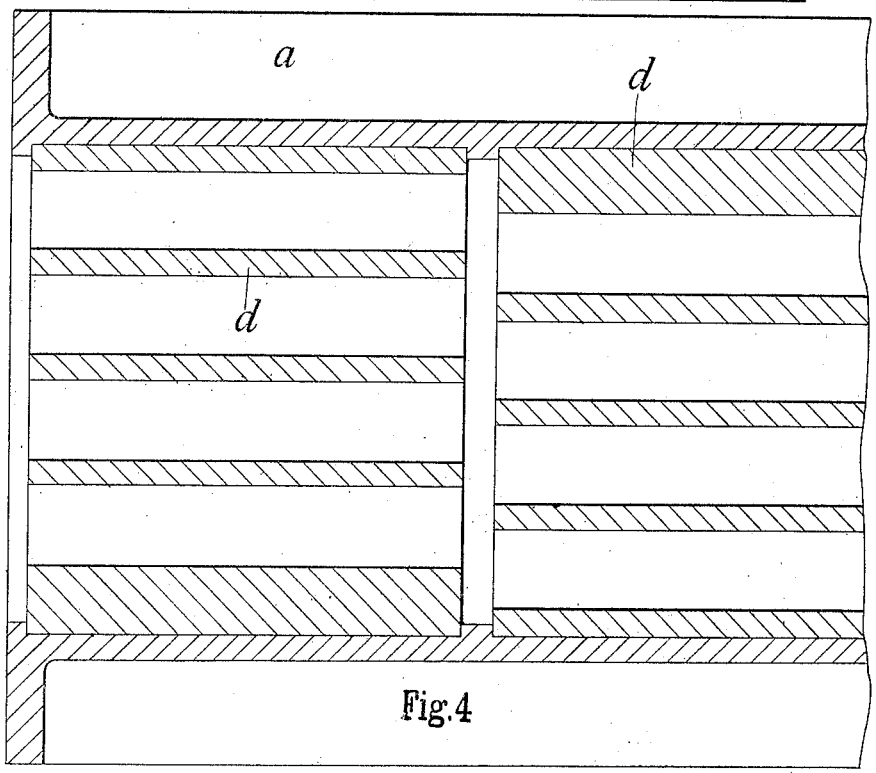
Inventor
F. W. Burstall
By K. R. Kerslake. Atty.

F. W. BURSTALL.
UTILIZATION OF EXHAUST HEAT FROM INTERNAL COMBUSTION ENGINES.
APPLICATION FILED FEB. 24, 1920.

1,359,447.

Patented Nov. 16, 1920.
3 SHEETS—SHEET 3.

Inventor
F. W. Burstall
By H. R. Kerslake
Atty.

UNITED STATES PATENT OFFICE.

FREDERIC WILLIAM BURSTALL, OF SELLY PARK, BIRMINGHAM, ENGLAND.

UTILIZATION OF EXHAUST HEAT FROM INTERNAL-COMBUSTION ENGINES.

1,359,447.  Specification of Letters Patent.  Patented Nov. 16, 1920.

Application filed February 24, 1920. Serial No. 360,855.

*To all whom it may concern:*

Be it known that I, FREDERIC WILLIAM BURSTALL, a subject of the King of Great Britain and Ireland, residing at 79 Oakfield Road, Selly Park, in the city of Birmingham, England, have invented certain new and useful Improvements Relating to the Utilization of Exhaust Heat from Internal-Combustion Engines, of which the following is a specification.

This invention has for its object to provide improved means operating on the regenerative principle for utilizing exhaust heat from internal combustion engines, the heat obtained from the exhaust gases being employed for heating air.

The invention comprises the use of carbon as the heat storing medium in the regenerative chambers. Also the invention comprises the arrangement of the carbon in the form of perforated or other bricks, pipes or the like, within a pair of chambers each open to the atmosphere, the chambers being put in turn into communication with the engine exhaust pipe. Further the invention comprises the employment of means as hereinafter described for the automatic actuation of the valves controlling the flow of gas and air through the regenerative apparatus.

Referring to the three accompanying sheets of explanatory drawings:—

Figure 1 is a side elevation, and Fig. 2 a plan showing a gas engine and producer provided with a regenerator system in accordance with this invention.

Fig. 3 is a cross section, and Fig. 4 a plan of a portion of one of the regenerative chambers.

In carrying the invention into effect as shown, a pair of long regenerator chambers or passages $a$ are used in conjunction with a gas engine $b$ and gas producer $c$. The chambers $a$ are packed with bricks or slabs $d$ made from any suitable and convenient form of carbon. In the form illustrated each slab is provided with parallel grooves or channels along its underside. Preferably the channels are so arranged as shown in Figs. 3 and 4 that the thickness of material at one edge of the slab is greater than at the opposite edge. This construction enables the channels of adjacent slabs to be staggered as shown. A number of slabs are superimposed as in Fig. 3, and if necessary any space between the upper slab and the cover of the chamber is filled with any suitable packing material. Spaces may advantageously be arranged between adjacent ends of the slabs as shown in Fig. 4. Preferably the bricks or slabs are made from ground coke, retort carbon, coal, anthracite or any other hard form of carbon, this material being mixed with a suitable carbonaceous binding agent, *e. g.* pitch, and molded to the required form. Subsequently the molded pieces are burnt or baked in an inert atmosphere. In the final state the surfaces of the pieces are hard, compact and smooth, and preferably the area which can be exposed to the hot gases is large relatively to the mass, as the depth of heating is small. Further the configuration and arrangement of the pieces is such that no detrimental resistance to flow of the exhaust gases is set up.

Owing to the high specific heat of the material a large amount of heat can be stored in apparatus of relatively small compass. The use of silicious or other usual refractory materials, or metals, is economically or otherwise impracticable for the purpose of this invention. Operating at the temperatures which are usual in exhaust gases from engines for which the invention is intended, *i. e.* engines operating on coal, producer, blast furnaces or like gases, the carbon is unaffected or is only affected to a degree which is of no practical consequence.

Figure 5:
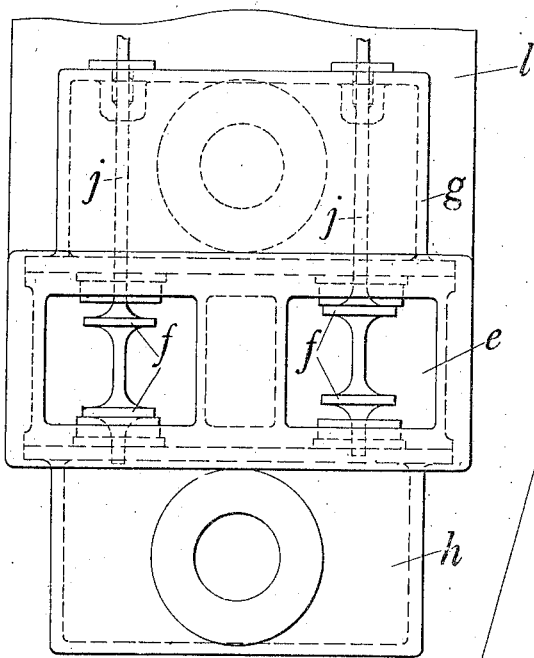
Fig. 5 is a front elevation of the controlling valves, and Fig. 6 a sectional side elevation showing mechanism for operating the valves.

At one end the regenerator chambers are connected to a valve box $e$ provided with reversible valves $f$ for controlling the flow of exhaust gases and air. Exhaust gas is brought into an upper chamber $g$ on the valve box, and hot air delivered through the lower chamber $h$. Both chambers can communicate with the valve box through passages controlled by the valves. Referring to Fig. 5 the left hand side of the valve box is open to the exhaust chamber, and the right hand side to the air chamber. This condition can be reversed by altering the relative positions of the valves. From the chamber $h$ hot air is conducted by a pipe $i$ to the producer or elsewhere as required. During one interval the direction of gas and air flow is as shown in Figs. 1 and 2, and during the next interval the direction of flow through the regenerative chambers is reversed. While exhaust gas from the engine is flowing through one of the regenerative chambers *a* to atmosphere, air is flowing from the atmosphere in the opposite direction through the other. Preferably the actuation of the valves is made dependent on the engine.

Figure 6:
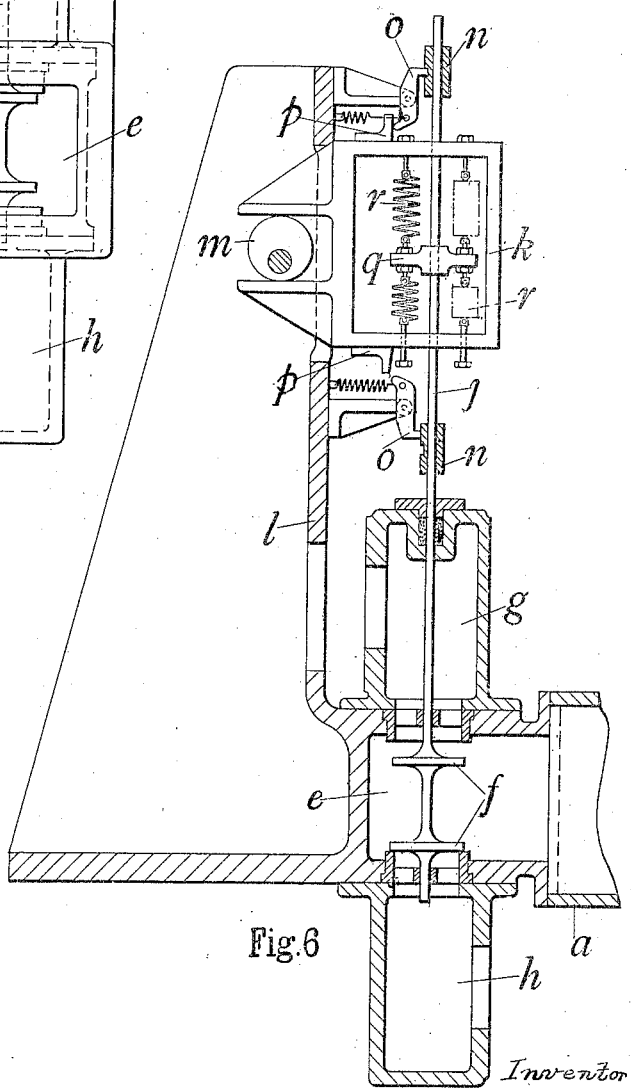

Referring to Fig. 6 which illustrates the operating mechanism of one of the valves, the valve stem *j* is extended and arranged to slide through a movable frame *k*. This frame is carried by any suitable guides on a bracket *l* and is reciprocated by a cam *m* driven at a slow speed through reducing gear from the engine. The stem is provided with a pair of notched collars *n* adapted to be engaged by spring controlled catches *o*. Inclined projections *p* on the frame are arranged to disengage the catches from the collars. A cross piece *q* on the stem is attached by springs *r* to the frame. In the position shown the frame is in the upper limit of its movement, and the upper catch has just been disengaged from the upper stem collar. During the upward movement of the frame the upper springs were extended, but no movement could be given to the valve stem owing to the action of the upper catch. This being released the springs can quickly raise the valve stem, causing the lower valve seating to be opened and the upper one closed. At the completion of this movement the lower catch engages the lower stem collar and thereby holds the valves. During the next half revolution of the cam the frame is brought down to the lower limit of its movement when the reverse operation is performed on the valve. A similar mechanism is arranged in conjunction with the other valve and the two mechanisms are so related that they operate in opposite directions. As the mechanisms are driven from the engine they effect the change-overs after a predetermined number of engine revolutions, the intervals between reversals being proportioned to suit the engine conditions or other requirements.

The air heated in the regenerators may be utilized for a variety of purposes. For example, it may be used for the air supply in coke ovens, or metallurgical furnaces, or for the warming of buildings, or drying chambers. In the system illustrated the heated air is used as already stated in the engine gas producer; if desired water vapor may be introduced with the air and converted into steam during its passage through the regenerative chamber.

The invention is not limited to any particular manner of arranging the carbon in the regenerative chambers or to any particular construction or arrangement of the regenerative chambers, or valve reversing mechanism, as these may be varied to meet different requirements.

Having thus described my invention what I claim as new and desire to secure by Letters Patent is:—

1. A structure for utilizing the exhaust heat from internal combustion engines, consisting in part of regenerative chambers, and carbon masses arranged within the said chambers to serve as the heat storing medium, substantially as described.

2. A structure for utilizing the exhaust heat from internal combustion engines, consisting in part of regenerative chambers, and hollow carbon bricks arranged within said chambers to serve as the heat storing medium, substantially as described.

3. A structure for utilizing the exhaust heat from internal combustion engines, consisting in part of a long chamber, and channeled carbon bricks arranged within said chamber, substantially as described.

4. In a structure for utilizing the exhaust heat from internal combustion engines, the combination comprising a plurality of chambers, channeled carbon bricks arranged within said chambers, and means whereby the exhaust gases and air are caused to alternately flow in opposite directions through said chambers, substantially as described.

5. In a structure for utilizing the exhaust heat from internal combustion engines, the combination comprising a pair of chambers, carbon masses arranged within said chambers for the storage of heat, a valve box provided with an exhaust gas inlet and an air outlet at one end of said chambers, valves whereby exhaust gases and air can be caused to flow alternately through the chambers, and automatic means for intermittently actuating the valves, substantially as described.

6. A structure for utilizing the exhaust heat from internal combustion engines, comprising the combination of a pair of parallel chambers, channeled carbon bricks arranged within said chambers, a hot air pipe, a valve box connecting adjacent ends of the chambers and air pipe, a pipe leading the exhaust gases from the engine to the valve box, valves within the box arranged to connect either of the chambers to the engine exhaust pipe and the other to the air pipe, and automatic means for intermittently reversing said connections, substantially as described.

7. A structure for utilizing the exhaust heat from internal combustion engines, comprising the combination of a pair of parallel chambers, carbon masses within said chambers, a hot air pipe, a valve box connecting the adjacent ends of the chambers and air pipe, a pipe leading exhaust gases from the engine to the valve box, a pair of valves within the box arranged to connect either of the chambers to the engine exhaust pipe and the other to the air pipe, a stem on each valve, a cross piece on each stem, a frame movable relatively to the stem, springs connecting the frame and cross piece, collars on the stem, catches adapted to engage said collars, means on the frame for releasing the catches, and a cam for reciprocating the frame and producing intermittent operation of the valve, the valve mechanism being arranged to produce intermittent reversals of flow through the chambers, substantially as described.

In testimony whereof I have signed my name to this specification.

FREDERIC WILLIAM BURSTALL.